United States Patent

[11] 3,633,901

| [72] | Inventor | Per G. E. Lindquist<br>Farsta, Sweden |
|---|---|---|
| [21] | Appl. No. | 869,570 |
| [22] | Filed | Oct. 27, 1969 |
| [45] | Patented | Jan. 11, 1972 |
| [73] | Assignee | Aktiebolaget Thugus Mekaniska Verkstad<br>Enskeda, Sweden |
| [32] | Priority | Nov. 25, 1968 |
| [33] | | Sweden |
| [31] | | 16011/68 |

[54] ARRANGEMENT IN OPERATING TABLES FOR BIG ANIMALS
8 Claims, 4 Drawing Figs.

[52] U.S. Cl. ..................................... 269/323,
108/141, 119/103
[51] Int. Cl. ..................................... A61d 3/00,
A61b 13/00
[50] Field of Search ........................... 269/323;
119/103; 108/141, 145; 5/62

[56] References Cited
UNITED STATES PATENTS
1,691,035  11/1928  Adams ........................ 108/141

| 2,338,783 | 1/1944 | Romeo ........................ | 108/141 |
| 2,897,029 | 7/1959 | Maisel ........................ | 269/323 |
| 3,397,411 | 8/1968 | Rossi ........................ | 108/141 |

Primary Examiner—Andrew R. Juhasz
Assistant Examiner—Z. R. Bilinsky
Attorney—Larson, Taylor & Hinds ABSTRACT: An operating table for large animals such as horses and the like. The table has a surface for supporting the animal, which table is mounted on a generally horizontal shaft extending therethrough and about which the table is rotatable. This shaft is connected to a bridge which is mounted on a second horizontal shaft generally perpendicular to the first shaft, the bridge being turnable about said second shaft. The bridge is then mounted on a vertically elevatable pole and means are provided for moving the pole vertically, and further means are provided for turning the pole about its axis. The supporting surface of the table is thus movable vertically, about the axis of its supporting pole and capable of being inclined about either of two mutually perpendicular horizontal axes.

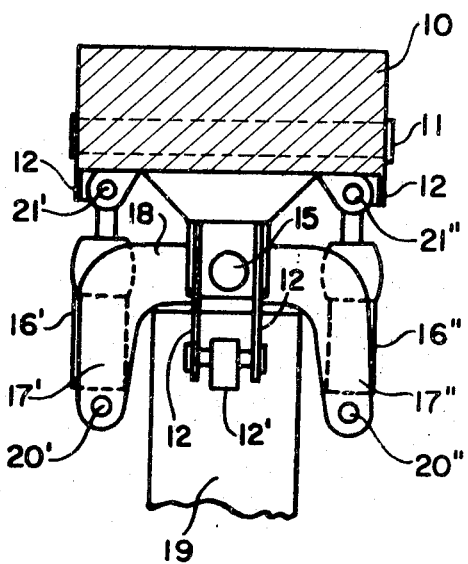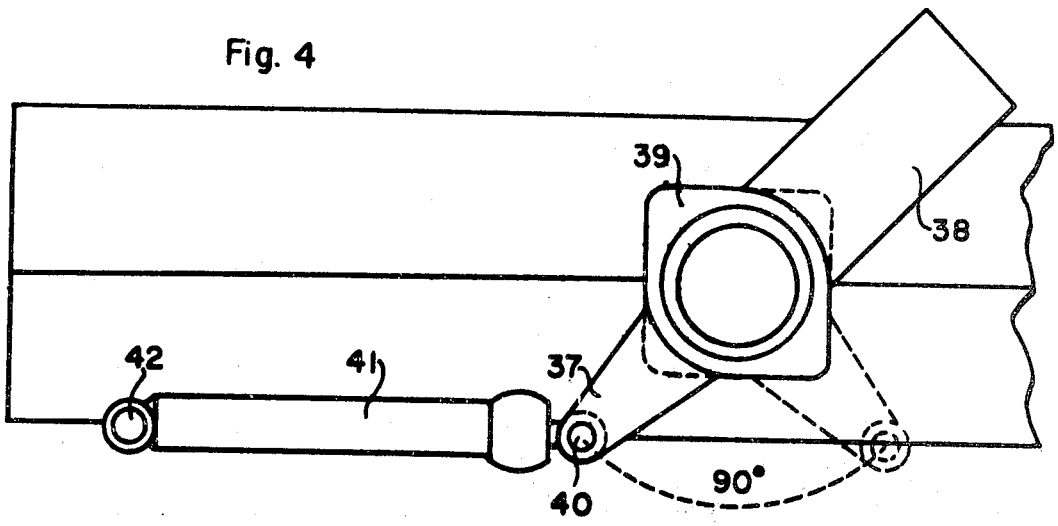

ARRANGEMENT IN OPERATING TABLES FOR BIG ANIMALS

Heretofore, in operations on big animals, for instance domestic animals such as horses and so on, the animals placed onto operation cushions, which were built up to a height of about one-half meter to 1 meter above the floor level, whereafter the operation was performed. This has proved extremely inconvenient to the veterinary surgeon, who has often had essential difficulty getting access to important parts of the animal where the operation should take place.

Therefore, it has also been proposed to provide operation tables, elevatable above the floor level, so that the height of the operation table above the floor could be changed hydraulically or mechanically, and to provide supports for the animal on said operation table by means of which one could change the position of the animal in a way more suitable for the operation. However, this arrangement has been unsatisfactory at certain times, for example when, during the operating procedure it becomes necessary to quickly change the position of the animal. Such changes are done firstly in a cardanic way, that means both regarding the slope across the longitudinal direction of the animal body, and regarding the inclination in the longitudinal direction of the animal body, and secondly by turning the entire operating table, it still being of value to effectively and quickly change the height of the operation table above the floor level.

The present invention thus refers to an arrangement in an operation tables for big domestic animals, the table being hinged on a shaft so that it may be turned by means of one or more servomotors in a first vertical level about this shaft. The shaft is connected to a bridge, which is turnable about a second shaft, at least approximately perpendicular to the first mentioned shaft by means of one or more further servomotors. The bridge is arranged at the upper end of a vertical, elevatable pole, which is composed by at least two parts, telescopically displacable in relation to each other.

According to the invention, the outer part in the telescopic pole is surrounded by a support ring, attached to said upper part, and by means of a number of guide rollers keeps the shaft in centered position, simultaneously as a second support ring, which is free from the shaft, is arranged to be elevated by means of servomotors.

By such an arrangement, one will obtain a quickly acting, effective means for adjusting the operation table with the animal placed thereon in practically any position, which may be advantageous for carrying through the operation.

The invention will be further described below in connection with a chosen form of execution, shown in the attached drawings, but it is understood that the invention shall not be limited to this specific form of execution, but that all different kinds of modifications may occur within the frame of the invention.

In the drawings, FIG. 1 is a side view of an operation table constructed according to the invention with parts of the table itself removed to save space.

FIG. 2 is a vertical sectional view taken along line 2—2 of FIG. 1.

FIG. 4 is a sectional view taken along line 4—4 of FIG. 1 and showing a control part for turning the operation table.

Figure 1:
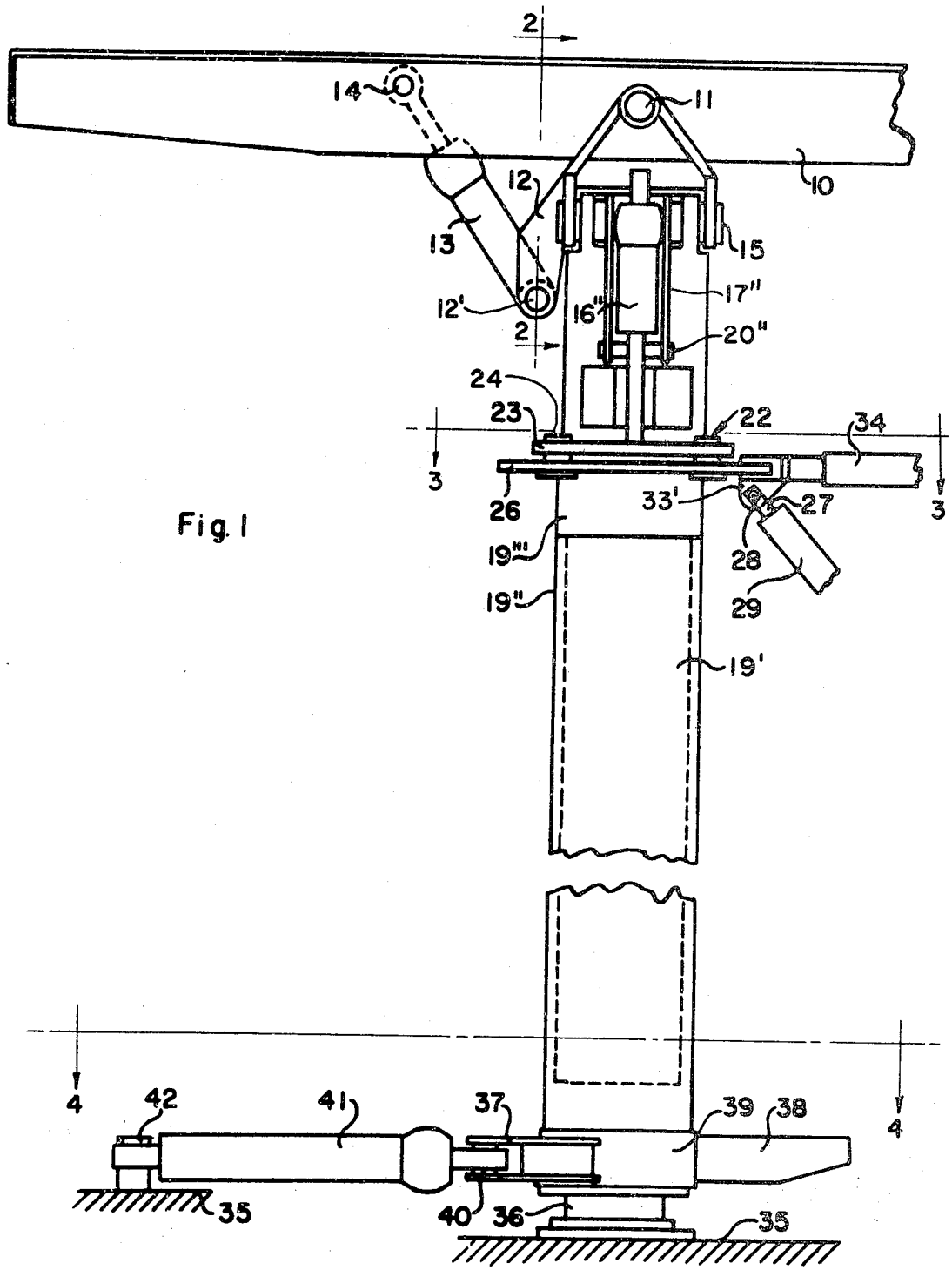

The table 10 on which the animal rests during the procedure of operation is shown in its position parallel to the floor in the operation room. The table, or course, should be provided with support arrangements for the animal, so that this animal is kept in a fixed position in relation to the table, but these do not form a subject of the present invention per se, and for that reason they have not been shown in the drawings. A shaft 11, FIG. 1, is arranged in a bearing on the lower side of the operation table 10 as well as in a bearing in a bridge 12, and between said bridge 12 and the lower side of the operation table 10 one or more servomotors 13 are provided, connected to bridge 12 at pivot pin 12' for changing the inclination of the operation table 10 by turning it about the shaft 11. The servomotor or servomotors 13 are preferably hydraulic, but they may also be of any other kind, for instance electric under influence of a self-braking screw. The important matter, however, is that they should work easily and nevertheless rather quickly, and also that they should be directly responsive so that they react without play or resiliency.

The servomotor or servomotors 13, which in similarity with the remaining servomotors existing in the arrangement are hydraulically controlled, but which, of course, could also be of any other kind, are pivotally connected to the shaft or shafts 14, respectively, in the operation table 10. It is especially suitable to provide two servomotors 13 in positions at diametric opposite ends of the table, although, for simplification of the description only the one, existing at the left side in FIG. 1, has been shown. The servomotors 13 thereby should be connected with control valves of such a kind, that pressure medium may be fed to the one, simultaneously as pressure medium is released in controlled stream from the other one, or vice versa. The table 10 thereby can be brought into any inclinated position relative to the horizontal level by turning about the shaft 11, so that its one end will be higher or lower than its other end.

For causing inclination crosswise of the table 10, so that its one long side will be higher or lower than its other long side, the bridge 12 is turnable about a shaft 15 and connected with a couple of further servomotors 16' and 16", which are also arranged in the same diametrical level, however in a suitable inclination or eventually, as shown in FIG. 2, vertically standing up from a couple of downwardly directed arms 17' and 17", respectively, on a head 18 which is mounted on top of the pole 19, on which all of the arrangement rests. The servomotors 16' and 16" are connected with the bridge 12 by means of a pair of shafts 21' and 21", respectively. Also in this case the arrangement may function with only one such servomotor 16' and 16", but preferably it should be provided with two servomotors 16, arranged in opposite directions to each other relative to the pole 19 and its head 18, with which they are connected by means of shafts 20' and 20", respectively.

It will be understood from this, that one may be influencing the operation table 10 on the one hand by means of the servomotors 13 and on the other hand by means of the servomotors 16' and 16" put this table in any suitable inclination, as if it were cardanically hinged.

Figure 3:
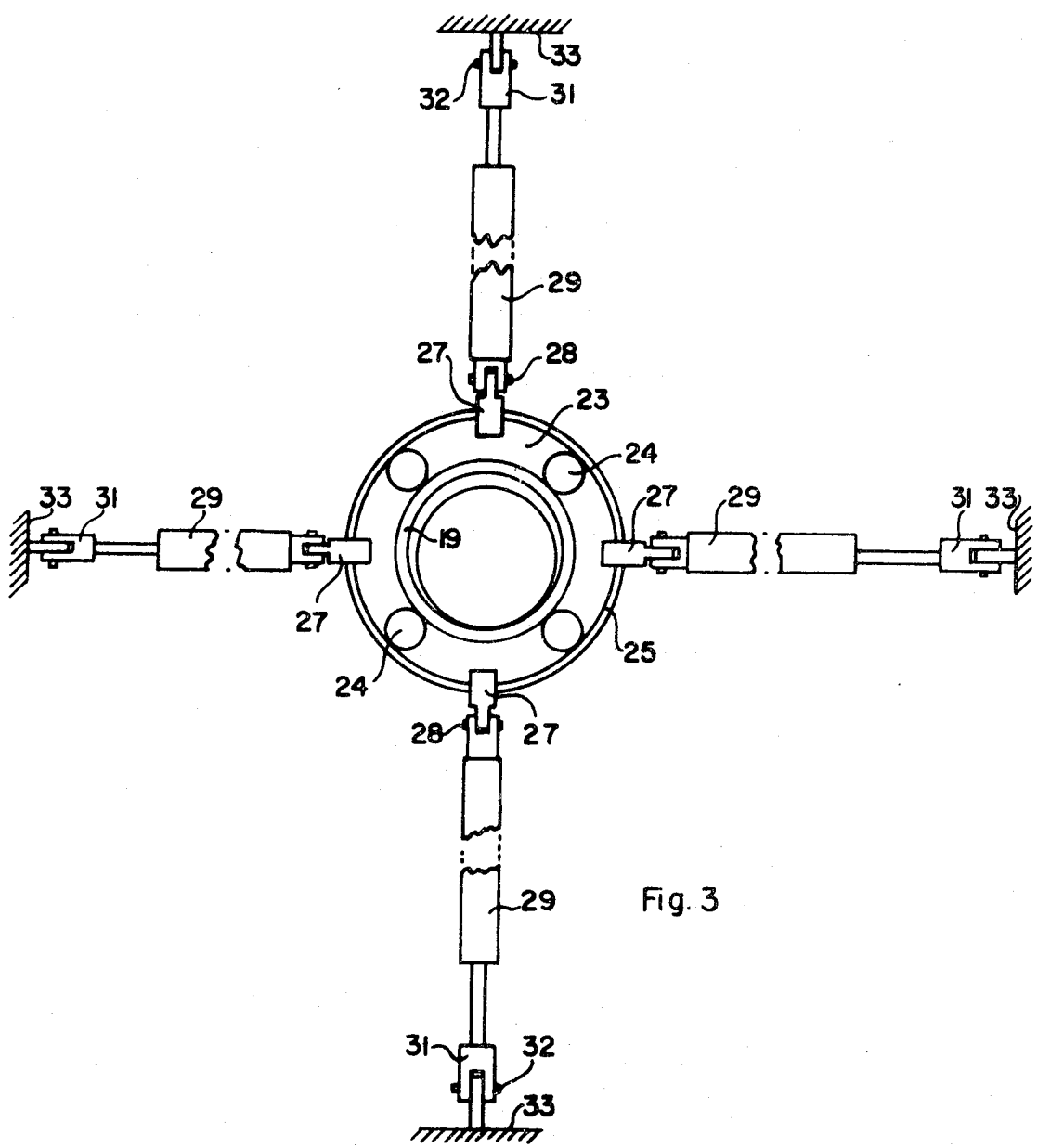
FIG. 3 is a horizontal plan view taken along line 3—3 of FIG. 2 but showing the complete support structure below the section line.

A support arrangement 22 is provided on the pole 19, suitably comprising at least one rigid ring 23, carrying up a number of circularily distributed rollers 24, see FIG. 3. The rollers are in contact on the one hand with the circumference of the cylindrical pole 19 and on the other hand with a rim 25 on the ring 23, so that the pole 19 may be turned about its shaft. The rollers 24 engage a second ring 26, see FIG. 1, which is embraced by a number of claws or forks 27, FIG. 3, said claws or forks being guidably connected over shafts 28 with the one end of a number of servomotors 29, for instance four such servomotors, which, with their other ends, are connected by means of claws or forks 31 and pins 32 to the walls 33 in a well below the floor level, in which the pole 19 is immerged. The claws or forks 27 are arranged in such a way, that they are kept stable in their horizontal position, for instance in the way shown in FIG. 1 by being rigged out from downwardly directed ears 33' in connection with arms 34 which run horizontally and which are guided by rails extending in a vertical direction along the walls 33 of the well. The pole 19 is telescopically arranged, so that it will contain an inner pole part 19' and an outer pole part 19".

The last described arrangement functions such that upon an extension of the servomotor 29, the outer pole part 19" will remain at a fixed height relative to the bottom 35 of the well in which it rests by means of a foot 36, whereas the inner pole part 19' is displaced upwardly, thereby taking with it the widened upper piece 19''' which is made integrally therewith. It is by means of the last-mentioned piece that the ring 23 is combined. Thereby the ring 23 will be elevated, carrying the inner pole and the operation table with it, so that said table may be elevated to a height comfortable for carrying through the operation.

The outer pole 19'' at its lower end is provided with an arm 37, FIG. 4, and with a counter weight 38, which is rigidly connected to a bottom plate 39. At its outer end the arm 37 is connected by means of a pin 40, with the movable end of a servomotor 41, the fixed end of which is connected by means of a pin 42 to the bottom 35 of the well, said connection being guidable.

After one has by means of the servomotors 29 elevated the operation table 10 into a comfortable working height, one may thus by means of the two sets of servomotors 13 and 16 adjust the operation table into the most advantageous inclination for carrying through the operation by means of a cardanic adjustment possibility, and one may also by means of the servomotor 41 turn the operation table into the most advantageous position in relation to the walls of the operation table. If the operation table is assumed to be square-formed or at least approximately square-formed, thus turning by 90° of the operation table will be fully sufficient, as indicated by dotted lines in FIG. 4.

It will be evident from the above, that one has in this way by a minimum of working means in the form of servomotors achieved a possibility of adjusting the operation table 10 into practically every desired position, whereby the operation is simplified to a high degree as compared with what was the case in hitherto used arrangements for similar purposes. All of the control means are arranged under the operation table, which means a very great advantage, because they do not assume any space, which the operating veterinary may need for his own movement during the operation. They are also well placed inside of the outer circumference of the operation table, so that the floor surface about the operation table will be completely free from such control means.

I claim:

1. An operation table for large animals and the like comprising: a table having a surface for supporting an animal on which an operation is to be performed, said table being mounted on a generally horizontal shaft extending therethrough and said table being rotatable about the axis of said shaft, means for turning the table about said shaft axis, said shaft being connected to a bridge, said bridge being mounted on a second shaft which is horizontal and generally perpendicular to the first shaft, the said bridge being rotatable about the axis of the said second shaft, means for turning the bridge about said second shaft axis, a vertical elevatable pole, said bridge being arranged on the upper end of said pole, said pole comprising at least two vertically telescopically matable parts, a first support ring surrounding the pole, spacing rollers between the support ring and the pole to permit rotation of the pole relative to the ring, and a second support ring surrounding the rollers and means for engaging the second support ring to raise the pole and hence raise the table.

2. An operating table according to claim 1, said means for turning the table and the bridge about the first and second shaft axes, respectively, comprising servomotors.

3. An operating table according to claim 2, including a further servomotor for turning the table about a vertical axis.

4. An operating table according to claim 2, in which said servomotors are made as hydraulic servomotors.

5. An operating table according to claim 1, in which support arms are provided for keeping the pole in a centered position relative to the walls of a well in which the pole is mounted.

6. An operating table according to claim 5, in which the said well has a depth such that in the lowered state of the telescopic pole the surface of the table will be substantially at the floor level of the operating room.

7. An operating table according to claim 1, in which the pole has a foot at its lower part and including means for engaging said foot to turn the pole about a vertical axis.

8. An operating table according to claim 7, in which the said arm is provided with a counterweight.

* * * * *